(12) United States Patent
Kurily et al.

(10) Patent No.: US 7,017,239 B2
(45) Date of Patent: Mar. 28, 2006

(54) COMPONENT CONNECTION SYSTEM

(75) Inventors: Brett Kurily, Grosse Point Farms, MI (US); Derek Scroggie, Macomb, MI (US)

(73) Assignee: Illinois Tool Works Inc., Glenview, IL (US)

( * ) Notice: Subject to any disclaimer, the term of this patent is extended or adjusted under 35 U.S.C. 154(b) by 31 days.

(21) Appl. No.: 10/737,700

(22) Filed: Dec. 16, 2003

(65) Prior Publication Data
US 2005/0034282 A1 Feb. 17, 2005

Related U.S. Application Data

(60) Provisional application No. 60/434,065, filed on Dec. 17, 2002.

(51) Int. Cl.
*F16B 5/00* (2006.01)
*F16B 21/08* (2006.01)
*E04F 19/02* (2006.01)

(52) U.S. Cl. .......................... 24/297; 411/508; 24/453
(58) Field of Classification Search ................. 24/453, 24/297
See application file for complete search history.

(56) References Cited
U.S. PATENT DOCUMENTS

| | | | | |
|---|---|---|---|---|
| 4,778,320 A | * | 10/1988 | Nakama | 411/509 |
| 4,795,116 A | * | 1/1989 | Kohut et al. | 248/73 |
| 5,173,026 A | * | 12/1992 | Cordola et al. | 411/508 |
| 5,217,337 A | * | 6/1993 | Junemann et al. | 411/45 |
| 5,507,610 A | * | 4/1996 | Benedetti et al. | 411/339 |
| 5,551,817 A | * | 9/1996 | Kanie | 411/107 |
| 5,647,713 A | * | 7/1997 | Ge et al. | 411/509 |
| 5,689,863 A | * | 11/1997 | Sinozaki | 24/297 |
| 5,716,161 A | * | 2/1998 | Moore et al. | 403/326 |
| 5,975,820 A | * | 11/1999 | Kirchen | 411/339 |
| 6,264,393 B1 | * | 7/2001 | Kraus | 403/282 |
| 6,336,768 B1 | * | 1/2002 | Kraus | 403/408.1 |
| 6,594,870 B1 | * | 7/2003 | Lambrecht et al. | 24/297 |
| 6,715,185 B1 | * | 4/2004 | Angellotti | 24/297 |

* cited by examiner

Primary Examiner—Robert J. Sandy
(74) Attorney, Agent, or Firm—Mark W. Croll; Paul F. Donovan

(57) ABSTRACT

A multi-component connection system suitable for automobiles includes a female clip member having a slot, and a male clip member having a male element insertable within the slot. The slot and male element include mutually engageable cooperative structures. A shank connected to the male element includes wings mounted at a distal end and capable of resilient lateral deflection relative to the longitudinal axis of the shank. The female clip member may be affixed to a first component and the male clip member may be insertable within a hole in a second component so as to connect the two components when the male clip member is inserted in the hole, the male element is disposed within the slot, and the cooperative structures are engaged.

22 Claims, 3 Drawing Sheets

COMPONENT CONNECTION SYSTEM

CROSS-REFERENCE TO RELATED APPLICATIONS

The present regular application claims benefit to United States Provisional Application Ser. No. 60/434,065 filed Dec. 17, 2002.

FIELD OF THE INVENTION

The present invention relates generally to assemblies for connecting automobile components, and, more particularly to a novel clip design that provides superior installation, removal and servicing capabilities for automobile components.

BACKGROUND OF THE INVENTION

Historically, claddings, wheel lips, bodyside moldings and other exterior trim components on automobiles have been attached using various clips, such as conventional "w-based" clips. An exemplary conventional connection system installation using such w-based clips includes an exterior component affixed to a sheetmetal panel by means of the w-based clip. The installation process generally includes drilling or punching a hole or slot in the sheetmetal panel and subsequent insertion and snap-fitting of wings of the w-based clip, which is installed onto the exterior component, into the hole. Thus far, the use of such w-based clips has provided an adequate means for securing various exterior components onto an automobile, as well as for securing various interior components within an automobile.

One drawback of this conventional connection system becomes apparent during automobile servicing involving the removal of components affixed using w-based clips. One apparent method of removing conventionally affixed components includes pressing the wings together, and removing the w-based clip in the direction opposite to its insertion direction. This method generally requires access to the w-based clip from behind the sheetmetal panel or behind the component into which the clip has been inserted. However, such access rarely is available.

An alternative method of removing conventionally affixed components includes the use of brute force by means of prying tools. This method, which is often the most widely employed to remove components utilizing w-based clips, frequently results in damage to the w-based clip, and/or the affixed components, such as, for example, the associated sheet metal panel. Due to cost related factors, damaged components are often scrapped and replaced with new components, which can significantly increase the cost of a routine repair.

It is apparent that, instead of a hole in the sheetmetal panel, a rectangular slot may be provided so that the w-based clip can be rotated during removal to avoid damage to the hole in the sheetmetal panel. However, this solution has drawbacks in that slots are significantly more expensive to punch compared to holes, and access behind the sheetmetal panel is still needed to facilitate removal of any affixed components.

Various prior-art component connection devices and techniques are known and disclosed, for example, in U.S. Pat. Nos. 5,975,820; 5,217,337; and 4,778,320.

These prior-art references do not provide an adequate means of component separation without the resulting damage to the attachment means and/or the components themselves. These prior-art references also disclose fasteners and the like including multiple elements which render the relatively complex designs thereof prone to failure and therefore unfeasible for use with automobile components.

Accordingly, there remains a need for a component connection and disconnection system, which provides fast component connection and removal capabilities, which is economically feasible to manufacture and utilize during installation of components in a fast-paced assembly line, and which efficiently and reliably enables repeatable installation and removal of components for servicing and the like.

SUMMARY OF THE INVENTION

The present invention solves problems and overcomes drawbacks and deficiencies of prior art component connection systems by providing a novel method and apparatus for automobile component connection and removal allowing for an improved disconnect of the components of the connection system, while also allowing for proper retention and connection between the components.

In one aspect thereof, the present invention provides a multi-component connection system with a female clip member including a slot having at least one protruding element disposed substantially along a circumference of the slot; and a male clip member including a male element insertable within the slot. The male element includes an indented area for complementary engagement with the protruding element of the female clip member. The male clip member further includes a shank connected to the male element along a longitudinal axis of the male element. The shank includes a distal end and at least two wings mounted transverse to the shank at the distal end, the wings being capable of resilient lateral deflection relative to the longitudinal axis. A recess extends inwardly from the distal end adjacent the wings to provide multiple flex points for deflection of the wings. The female clip member is connectable to a first component and the male clip member is insertable within a hole in a second component so as to connect the two components when the female clip member is connected to the first component, the male clip member is inserted in the hole such that the wings are fully inserted within the hole, the male element is disposed within the slot and the indented area is engaged with the protruding element.

In another aspect thereof, the present invention provides a multi-component connection system for automobiles with a female clip member including a slot having at least one engagement structure disposed substantially along a circumference of the slot; and a male clip member including a male element insertable within the slot. The male element includes at least one complementary engagement structure for securing an axial relationship between the female clip member and the male clip member. The male clip member further includes a shank having first and second ends, the first end of the shank being connected to an end of the male element along a longitudinal axis of the male element. The shank includes at least two wings mounted transverse to the shank at the second end, the wings being capable of resilient lateral deflection relative to the longitudinal axis. The female clip member is connectable to a first component and the male clip member is insertable within a hole in a second component so as to connect the two components when the female clip member is connected to the first component, the male clip member is inserted in the hole such that the wings are fully inserted within the hole, the male element is disposed within the slot and the engagement structure and the complementary engagement structure are engaged.

In still another aspect thereof, the present invention provides a method of connecting and disconnecting components in automobiles by means of a multi-component connection system. The system provides a female clip member including a slot having engagement structure disposed substantially along a circumference of the slot, and a male clip member including a male element insertable within the slot. The male element includes complementary engagement structure for interconnecting the male clip member and the female clip member. The male clip member further includes a shank having first and second ends, the first end of the shank being connected to an end of the male element along a longitudinal axis of the male element. The shank includes at least two wings mounted transverse to the shank at the second end. The wings are capable of resilient lateral deflection relative to the longitudinal axis. The method has steps of affixing the female clip member to a first component; inserting the male element into the slot so as to engage the engagement structure and the complementary engagement structure; and inserting the male clip member within a hole in a second component such that the wings are fully inserted within the hole so as to connect the two components.

A feature of the present invention is to provide a component connection system that is usable with existing vehicle components.

Another feature of the present invention is to provide a system that can be serviced completely from the exterior of a vehicle.

Yet another feature of the present invention is to provide a system which leaves all components undamaged after removal.

Other features and advantages of the invention will become apparent to those skilled in the art upon review of the following detailed description, claims and drawings in which like numerals are used to designate like features.

Figure 1:
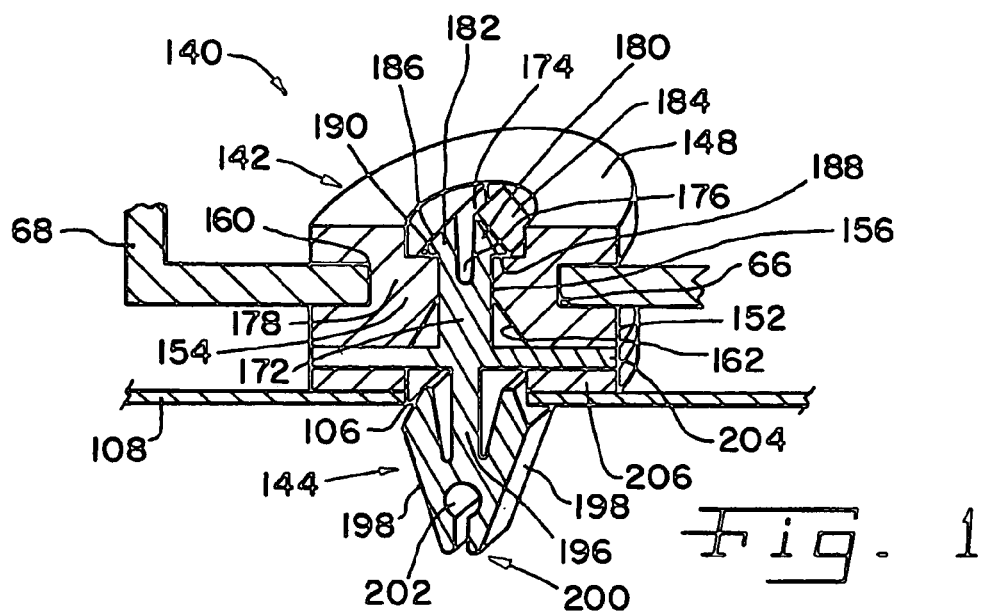
FIG. 1 is an isometric cutaway view of an embodiment of a component connection system of the present invention, illustrating the component connection system in an assembled configuration.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now to the drawings wherein like reference numerals designate corresponding parts throughout the several views, FIGS. 1–7 illustrate component connection systems according to the present invention.

Component connection system 140 (FIG. 1) includes a female clip member 142 and a male clip member 144. Female clip member 142 includes first and second flanges 148 and 152, respectively, joined by a centrally located neck 154. First and second flanges 148 and 152, respectively, and neck 154, may be manufactured as a single component or as separate components and joined thereafter. A slot 156 along the central axis of female clip member 142 includes a peripheral ledge 160 provided in first flange 148 and an inwardly tapering entrance surface 162 in second flange 152. Female clip member 142 includes a generally circular, or alternatively a rectangular profile when viewed in the direction of the longitudinal axis of slot 156. Those skilled in the art will appreciate, in view of this disclosure, that the profile and surface contours of female clip member 142 may be formed in a variety of configurations, contrary from the particular configuration illustrated in FIG. 1.

Male clip member 144 includes a male element 172, which can be cylindrical, rectangular, or of any suitable configuration, including an end cut 174 extending inwardly from the end thereof to define opposed distal members 176 and 178. Distal members 176 and 178 include flanges 180 and 182, respectively, defined by outwardly sloping surfaces 184 and 186, respectively, and undercuts 188 and 190, respectively. Male element 172 and slot 156 of female clip member 142 may be dimensioned to provide a "snap" fit engagement upon insertion of cylindrical male element 172 into slot 156 of female clip member 142, with distal members 176 and 178 being deflected inward by tapering entrance surface 162 to slide through slot 156. Upon sliding past ledge 160, distal members 176 and 178 spring outwardly, with undercuts 188 and 190 disposed against ledge 160. Slot 156 together with ledge 160 in female clip member 142, and male element 172 together with distal members 176 and 178 in male clip member 144 provide cooperative engagement structures to lock female clip member 142 and male clip member 144 in axially fixed positions, each with respect to the other.

Male clip member 144 may further include an elongated shank 196, and two or more wings 198 formed at an end thereof. Shank 196 may be formed integrally with male element 172, or alternatively, may be screwed into a threaded hole (not shown) in male element 172. Wings 198 may be formed at the end of elongated shank 196 to allow for resilient lateral deflection thereof relative to the central axis of elongated shank 196 during insertion and removal from a hole 106 in a panel 108. Each wing 198 may further include a tapered section having a widened end portion to effectuate retention of male clip member 144 within a hole 66 in a panel 68, and to also prevent inadvertent withdrawal of male clip member 144 from hole 106. Those skilled in the art further will appreciate, in view of this disclosure, that the configuration, profile and surface contours of male clip member 144 may be formed in a variety of configurations.

At a distal end 200 of shank 196, a deflection controlling recess 202 is provided, extending inwardly from distal end 200. The shape and size of recess 202 is controlled for creating multiple flex points for deflection of wings 198 during installation and removal. By controlling the shape and size of recess 202, desired forces different for insertion and removal can be achieved. A generally keyhole shaped recess 202 is shown, and has been found to perform satisfactorily in at least some applications and uses of the present invention.

A radially extending collar 204 is provided on shank 196 inwardly from wings 198 relative to distal end 200. Collar 204 is provided for controlling the insertion of male clip member 144 into panel 108. Additionally, collar 204 functions as a seat against which a seal 206 can be placed when some degree of sealing is required in hole 106 to inhibit the transport of air, noise, fumes, water or other fluids therethrough. T-ribs or other structures can be used to limit the insertion distance of male clip member 144 into hole 106 in panel 108. Such structures may be contiguously engaged with an outer surface of female clip member 142 or may instead be aligned into complementary slots to facilitate alignment and retention thereof relative to the female clip member.

In order to install component connection system 140, female clip member 142 maybe installed into hole 66 in the form of a cutout 66 in exterior trim member panel 68. Female clip member 142 may be retained in cutout 66 by frictional engagement between the interior wall surfaces of first and second flanges 148 and 152, respectively, and the outer surfaces of exterior trim member 68. Those skilled in the art will appreciate, in view of this disclosure, that female clip member 142 could be retained in cutout 66 by other means, such as by adhesive, or by fasteners and the like. Moreover, those skilled in the art will appreciate, in view of this disclosure, that female clip member 142 could be connected to exterior trim member panel 68 by means such as adhesive, fasteners, clamping and the like, without the need for inserting female clip member 142 in cutout 66 in exterior trim member 68.

Upon installation of female clip member 142 into cutout 66, cylindrical male element 162 of male clip member 144 may be inserted into slot 156 such that distal members 176 and 178 engage and are deflected inwardly by entrance surface 162, to slide through slot 156. As the outer edges of flanges 180 and 182 slide past ledge 160, distal members 176 and 178 spring outward, with undercuts 188 and 190 disposed adjacent ledge 160. Seal 206 is over distal end 200 and against collar 204. Exterior trim member 68 having female clip member 142 and a male clip member 144 with seal 206 installed thereon may then be aligned and engaged with panel 108. Specifically, male clip member 144 may be inserted into hole 106 until wings 198 become engaged with the circumferential edge of hole 106. Seal 206 is compressed between collar 204 and panel 108.

Figure 2:
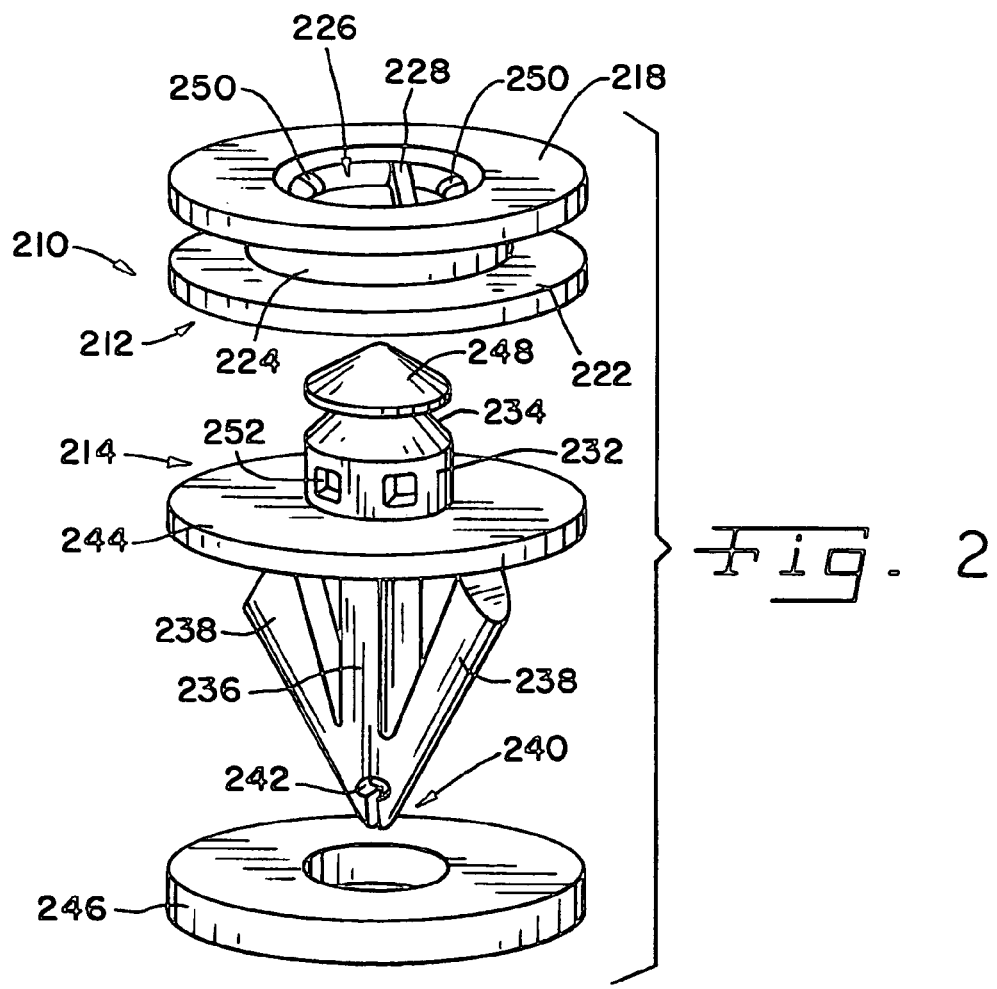
FIG. 2 is an isometric exploded view of another embodiment of a component connection system of the present invention.
Figure 3:
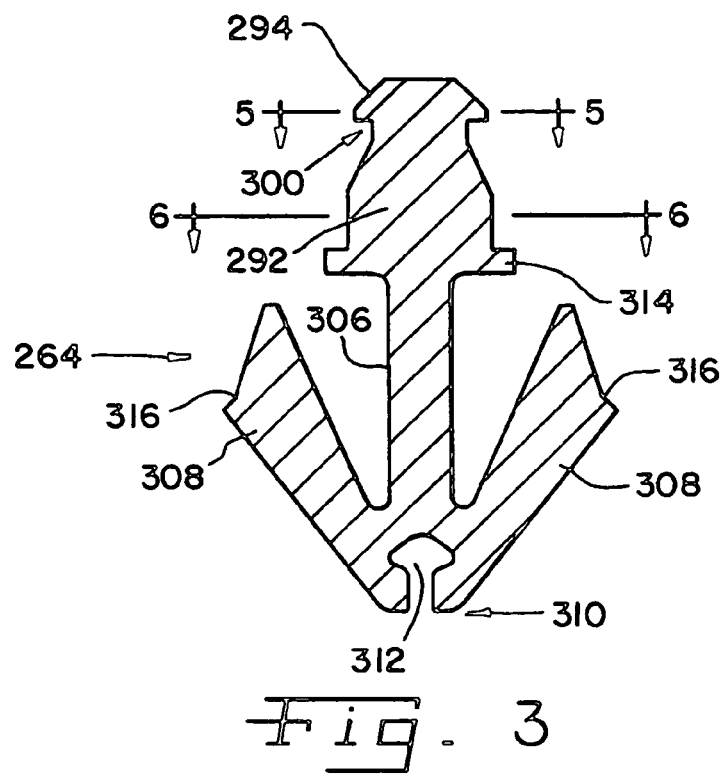
FIG. 3 is a cross-sectional view of one preferred male component for a component connection system of the present invention.
Figure 4:
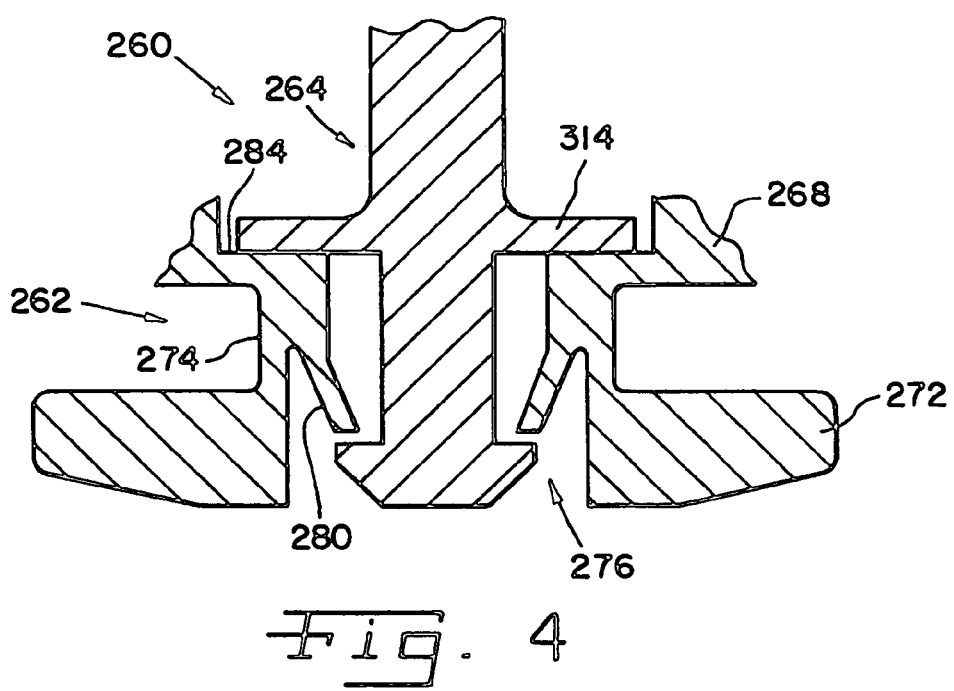
FIG. 4 is an enlarged fragmentary cross-sectional view of a component connection system of the present invention having a preferred female component, with the system shown in an assembled configuration.
Figure 5:
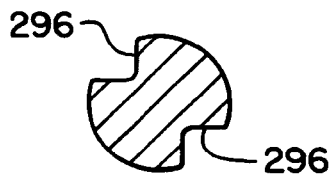
FIG. 5 is a cross-sectional view of the preferred male component shown in FIG. 3, taken on line 5—5 of FIG. 3.

FIG. 2 illustrates a further variation in which a component connection system 210 includes a female clip member 212 and a male clip member 214. Female clip member 212 includes first and second flanges 218 and 222, respectively, joined by a centrally located neck 224. First and second flanges 218 and 222, respectively, and neck 224, may be manufactured as a single component or as separate components and joined thereafter. A slot 226 is provided substantially along the central axis of female clip member 212 extending from one end thereof to the other end thereof. Securing fixtures are provided in slot 226, and may be in the form of a plurality of inwardly extending fingers 228. Female clip member 212 includes a generally circular, or alternatively a rectangular profile when viewed in the direction of the longitudinal axis of slot 226. Those skilled in the art will appreciate, in view of this disclosure, that the profile and surface contours of female clip member 212 may be formed in a variety of configurations other than the particular configuration illustrated in herein.

Male clip member 214 includes a cylindrical male element 232 including indented section 234 disposed along a length thereof. Indented section 234 may extend generally around the entire circumference of cylindrical male element 232, or instead, may be disposed in sections (not shown) along the circumference of cylindrical male element 232. Cylindrical male element 232 with indented section 234 thereof and slot 226 with fingers 228 of female clip member 212 are dimensioned to provide "snap" fit engagement upon insertion of cylindrical male element 232 into slot 226. Those skilled in the art will appreciate, in view of this disclosure, that male element 232 may be formed of a rectangular or similar cross-section and slot 226 in female clip member 212 may be configured for complementary engagement with male element 232. Further, while fingers 228 are described and shown in slot 226 and indented section 234 on male element 232, an opposite construction can be used, with indented section 234 in slot 226 and fingers 228 on the periphery of male element 232. In either configuration, cooperative engagement structures are provided for engagement with each other, to lock female clip member 212 and male clip member 214 in axially fixed positions, each with respect to the other.

Male clip member 214 further includes an elongated shank 236, and two or more wings 238 formed at a distal end 240 thereof, and includes a deflection controlling recess 242, all similar in construction and function to the similar parts shown and previously described. A radially extending collar 244 is provided on shank 236 inwardly from wings 238 relative to distal end 240. Collar 244 functions similarly to collar 204 in controlling the insertion of male clip member 214 into panel 108. Additionally, collar 244 functions as a seat against which a seal 246 can be placed when some degree of sealing is required in hole 106 to inhibit the transport of air, water or other fluids therethrough.

Installation of component connection system 210 is similar to that described previously, with female clip member 212 installed into cutout 66 in exterior trim member 68. Female clip member 212 may be retained in cutout 66 by frictional engagement between the interior wall surfaces of first and second flanges 218 and 222, respectively, and the outer surfaces of exterior trim member 68. Those skilled in the art will appreciate in view of this disclosure that female clip member 212 could be retained in cutout 66 by other means, such as by adhesive, or by fasteners and the like. Moreover, those skilled in the art will appreciate, in view of this disclosure, that female clip member 212 could be connected to exterior trim member 68 by means such as adhesive, fasteners, clamping and the like, without the need for inserting female clip member 212 in cutout 66 in exterior trim member 68.

Upon installation of female clip member 212 into cutout 66, cylindrical male element 232 of male clip member 214 may be inserted into slot 226 such that fingers 228 engage and snap into indented section 234 of male element 232. Seal 246 is slid over distal end 240 and against collar 244. Exterior trim member 68 having female clip member 212 and male clip member 214 with seal 246 installed thereon may then be aligned and engaged with panel 108. Specifically, male clip member 214 may be inserted into hole 106. Seal 246 is compressed between collar 244 and panel 108.

Component connection system 210 is provided with additional advantageous features. To facilitate alignment of female clip member 212 and male clip member 214, and to gradually deflect fingers 228 outwardly as male clip member 214 advances through slot 226, male element 232 is provided with a conical end 248 that first engages fingers 228. To restrict relative rotation between female clip member 212 and male clip member 214, slot 226 is further provided with inwardly directed tabs 250, and male element 232 is provided with windows 252. Tabs 250 and windows 252 are cooperatively arranged so that tabs 250 are disposed in windows 252 when component connection 210 is an assembled condition, and relative rotation between female clip member 212 and male clip member 214 is inhibited. Those skilled in the art will recognize that the locations of tabs 250 and windows 252 can be reversed, with tabs 250 provided on male element 232 and windows 252 provided in surfaces forming slot 226.

Figure 6:
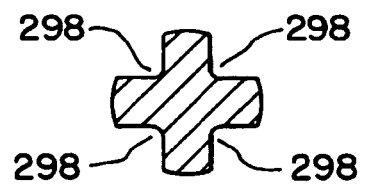
FIG. 6 is a cross-sectional view of the preferred male component shown in FIG. 3, taken on line 6—6 of FIG. 3.
Figure 7:
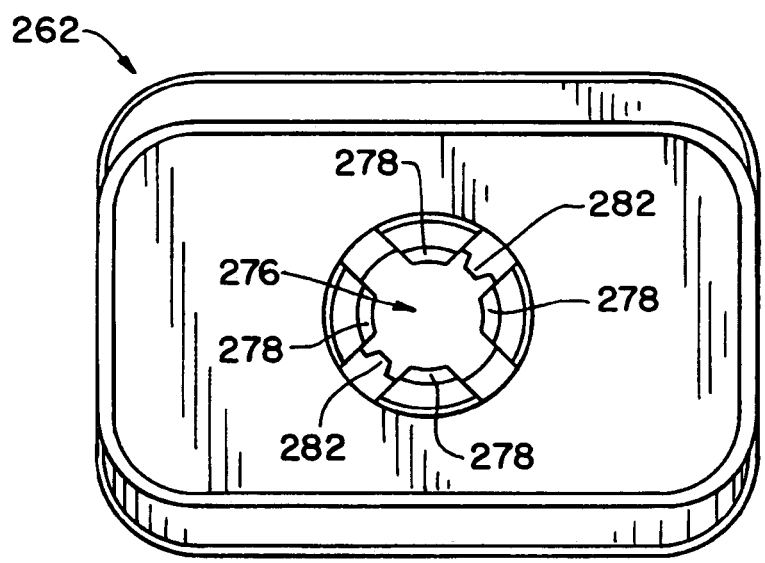
FIG. 7 is a plan view of the female component shown in FIG. 4.

FIGS. 3–7 illustrate yet another component connection system 260 in accordance with the present invention. Component connection system 260 includes a female clip member 262 and a male clip member 264. Female clip member 262 includes first and second flanges 268 and 272, respectively, joined by a centrally located neck 274. First and second flanges 268 and 272, respectively, and neck 274 may be manufactured as a single component or as separate components joined thereafter. A slot 276 (FIG. 7) along the central axis of female clip member 262 includes inwardly directed deflectable fingers 278. Four fingers 278 are shown and described with respect to the embodiment shown in FIGS. 3–7; however, those skilled in the art will readily recognize that more or fewer fingers 278 can be used. Slot 276 is further provided with inwardly directed tabs 282. Tabs 282 extend inwardly in slot 276, a distance less than that of fingers 278. In the embodiment shown, two diametrically opposed tabs 282 are shown; however, again, those skilled in the art will readily recognize that more or fewer tabs 282 can also be used. A ledge 284 is provided in first flange 268 adjacent slot 276. As seen in FIG. 7, female clip member 262 includes a generally rectangular profile when viewed in the direction of the longitudinal axis of slot 276. However, those skilled in the art will appreciate, in view of this disclosure, that the profile and surface contours of female clip member 262 may be formed in a variety of configurations contrary from the particular configuration illustrated in FIGS. 3–7.

Male clip member 264 includes a male element 292 having a frustum shape head 294 having one or more notches 296 (FIG. 5) in the periphery thereof. Notches 296 are disposed in spaced relationship around head 294 to receive in sliding engagement the one or more tabs 282 provided in slot 276. Male element 292 further includes one or more flutes 298 along the length thereof (FIG. 6). An indented section 300 in the way of a waist is provided between flutes 298 and head 294. Cylindrical male element 292 and female clip member 262 are dimensioned to provide "snap" fit engagement upon insertion of cylindrical male element 292 into slot 276.

Male clip member 264 (FIG. 3) further includes an elongated shank 306 and two or more wings 308 formed at a distal end 310 thereof, and includes a deflection controlling recess 312 all similar in construction and operation to the similar parts previously shown and described. Collar 314 is positioned at an end of flutes 298, generally at the transition between male element 292 and shank 306. Wings 308 are provided with notches 316 on end surfaces thereof to facilitate engagement and retention of male clip member 264 within hole 106.

Installation of component connection system 260 is similar to that described previously. Female clip member 262 may be retained in an exterior trim member (not shown) by frictional engagement thereof between first and second flanges 268 and 272, or by other means such as adhesive, fasteners and the like.

Upon installation of female clip member 262, cylindrical male element 292 of male clip member 264 is inserted into slot 276 such that tabs 282 align with notches 296, allowing tabs 282 to slide past head 294. Female clip member 262 and male clip member 264 are urged toward each other such that fingers 278 contact and are deflected outwardly by head 294. As fingers 278 move past head 294, fingers 278 engage and snap into waist 300, with ends of fingers 278 beneath and against head 294. The alignment of fingers 278 and tabs 282 with notches 296 and flutes 298 provides limited relative rotation between female clip member 262 and male clip member 264. Collar 314 rests on ledge 284 to inhibit further advancement of male clip member 264 into slot 276. Those skilled in the art will recognize that the various structures described can be reversed, so long as cooperative engagement structures are provided in each female clip member 262 and male clip member 264. The cooperative structures are provided for engagement with each other, to lock female clip member 262 and male clip member 264 in axially fixed positions, each with respect to the other.

Thereafter, the assembled component connection system 260 of interconnected female clip member 262 and male clip member 264 can be aligned with and connected to an automobile panel or other structure as necessary.

The various embodiments shown and described herein include engagement structures within slots 156, 226 and 276 and complementary engagement structures on male elements 172, 232 and 292 by which female clip members 142, 212 and 262 and male clip members 144, 214 and 264 can be connected to each other so as to secure an axial relationship therebetween.

The present invention provides a component connection system that is versatile in connecting different types of components and in the methods by which connections are made. The descriptions of the methods above include connecting the female clip member to a first component, then connecting the male clip member to the female clip member, and thereafter connecting the partial assembly to a second component by connecting the second component to the male clip member. In some situations, it may be advantageous to first connect the male clip member to one component, then the female clip member to the male clip member, and finally the partial assembly to the other component by connection to the female clip member. Alternatively, the female clip member and the male clip member can be connected to different components, and thereafter connected to each other to join the two components in an assembly. As yet another variation, the female clip member and the male clip member can be connected to each other, and thereafter components connected to each.

It should be noted that designations such as "exterior trim members" and "panels" have been provided for illustrative purposes only, and that component connection systems in accordance with the present invention may be utilized for connecting interior as well as exterior components in an automobile, or for connecting components other than automobile components, such as but not limited to, for example, appliance components, machinery components and the like. Each of the elements described above for the component connection systems in accordance with the invention may be formed of plastics, ceramics, metals, and the like, and/or combinations thereof, and may be manufactured by methods such as injection molding, casting and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A multi-component connection system comprising:
    a female clip member including an opening; and
    a male clip member including a fastener portion and a male element insertable within said opening, said one of said female clip member and said male clip member having at least one protruding element, and the other of said female clip member and said male clip member including an indented area for complementary engagement with said protruding element when said male clip member is inserted within said female clip member;
    wherein said female clip member is connectable to a first component and said male clip member is insertable within an opening in a second component so as to connect the two components when said female clip member is connected to the first component, said male clip member is inserted in the opening in the second component such that said fastener portion connects said male clip member to the second component, and said female clip member and said male clip member are connected together;
    wherein said female clip member includes a slot having said at least one protruding element which is disposed substantially along a circumference of said slot, and wherein said male element of said male clip member includes said indented area for complementary engagement with said protruding member of said female clip member; and
    wherein said male element defines at least one window, and said slot has an inwardly directed tab received in said window.

2. The system according to claim 1, wherein said fastener portion of said male clip member includes a shank connected to said male element along a longitudinal axis of said male element, said shank including a distal end and at least two wings mounted transverse to said shank at said distal end, said wings being capable of resilient lateral deflection relative to said longitudinal axis, and a recess extending inwardly from said distal end adjacent said wings to provide multiple flex points for deflection of said wings, such that when said male clip member is inserted within the opening in the second component, said wings are fully inserted within the opening of the second component.

3. The system according to claim 2, wherein said wings include a notch for inhibiting withdrawal of said male clip member when inserted in the associated opening.

4. The system according to claim 1, wherein said male clip member includes T-ribs to limit insertion of said male clip member into the opening in the second component.

5. The system according to claim 1, wherein said male clip member defines a collar, and a seal is disposed on said male clip member between said collar and the second component.

6. The system according to claim 1, said male element having a conical head.

7. A multi-component connection system comprising:
    a female clip member including an opening; and
    a male clip member including a fastener portion and a male element insertable within said opening, said one of said female clip member and said male clip member having at least one protruding element, and the other of said female clip member and said male clip member including an indented area for complementary engagement with said protruding element when said male clip member is inserted within said female clip member;
    wherein said female clip member is connectable to a first component and said male clip member is insertable within an opening in a second component so as to connect the two components when said female clip member is connected to the first component said male clip member is inserted in the opening in the second component such that said fastener portion connects said male clip member to the second component, and said female clip member and said male clip member are connected together;
    wherein said female clip member includes a slot having said at least one protruding element which is disposed substantially along a circumference of said slot, and wherein said male element of said clip member includes said indented area for complementary engagement with said protruding member of said female clip member; and
    wherein said female clip member includes bodies extending inwardly in said slot and said male clip member includes structure for receiving said bodies to inhibit relative rotation between said female clip member and said male clip member.

8. The system according to claim 7, wherein said female clip member includes first and second flanges, the first component being clamped between said first and second flanges to thereby affix said female clip member to the first component.

9. The system according to claim 7, wherein said female clip member includes at least one tab extending inwardly in said slot, and said male element defines a window for receiving each said tab.

10. A multi-component connection system, comprising:
    a female clip member including a slot having at least one engagement structure disposed substantially along a circumference of said slot; and
    a male clip member including a male element insertable within said slot, said male element including at least one complementary engagement structure for securing an axial relationship between said female clip member and said male clip member, said male clip member further including a shank having first and second ends, said first end of said shank being connected to an end of said male element along a longitudinal axis of said male element, said shank including at least two wings mounted transverse to said shank at said second end, said wings being capable of resilient lateral deflection relative to said longitudinal axis;

wherein said female clip member is connectable to a first component and said male clip member is insertable within a hole in a second component so as to connect the two components when said female clip member is connected to the first component, said male clip member is inserted in the hole such that said wings are fully inserted within the hole, said male element is disposed within said slot and said engagement structure and said complementary engagement structure are engaged; and wherein said female clip member includes bodies extending inwardly in said slot and said male clip member includes structure for receiving said bodies to inhibit relative rotation between said female clip member and said male clip member.

11. The system according to claim 10, wherein said female clip member includes first and second flanges, and the first component is secured between said first and second flanges to thereby affix said female clip member to the first component.

12. The system according to claim 10, wherein said male clip member defines a collar, and a seal is disposed on said male clip member between said collar and the second component.

13. The system according to claim 10, said male element having a conical head.

14. The system according to claim 10, wherein said shank defines a recess extending inwardly from said second end between said wings, forming multiple flex points for deflection of said wings.

15. The system according to claim 14, said recess being keyhole shaped.

16. A multi-component connection system, comprising:
a female clip member including a slot having at least one engagement structure disposed substantially along a circumference of said slot; and
a male clip member including a male element insertable within said slot, said male element including at least one complementary engagement structure for securing an axial relationship between said female clip member and said male clip member, said male clip member further including a shank having first and second ends, said first end of said shank being connected to an end of said male element along a longitudinal axis of said male element, said shank including at least two wings mounted transverse to said shank at said second end, said wings being capable of resilient lateral deflection relative to said longitudinal axis;
wherein said female clip member is connectable to a first component and said male clip member is insertable within a hole in a second component so as to connect the two components when said female clip member is connected to the first component, said male clip member is inserted in the hole such that said wings are fully inserted within the hole, said male element is disposed within said slot and said engagement structure and said complementary engagement structure are engaged; and
wherein said male element defines at least one window, and said slot has an inwardly directed tab received in said window.

17. A multi-component connection system, comprising:
a female clip member including a slot having at least one engagement structure disposed substantially along a circumference of said slot; and
a male clip member including a male element insertable within said slot, said male element including at least one complementary engagement structure for securing an axial relationship between said female clip member and said male clip member, said male clip member further including a shank having first and second ends, said first end of said shank being connected to an end of said male element along a longitudinal axis of said male element, said shank including at least two wings mounted transverse to said shank at said second end, said wings being capable of resilient lateral deflection relative to said longitudinal axis;
wherein said female clip member is connectable to a first component and said male clip member is insertable within a hole in a second component so as to connect the two components when said female clip member is connected to the first component said male clip member is inserted in the hole such that said wings are fully inserted within the hole, said male element is disposed within said slot and said engagement structure and said complementary engagement structure are engaged; and
wherein said female clip member defines a ledge adjacent said slot, and said male element includes first and second deflectable distal members separated by an inwardly extending end cut, each said distal member having an outwardly extending flange for engaging said ledge.

18. A multi-component connection system, comprising:
a female clip member including a slot having at least one engagement structure disposed substantially along a circumference of said slot; and
a male clip member including a male element insertable within said slot, said male element including at least one complementary engagement structure for securing an axial relationship between said female clip member and said male clip member, said male clip member further including a shank having first and second ends, said first end of said shank being connected to an end of said male element along a longitudinal axis of said male element, said shank including at least two wings mounted transverse to said shank at said second end, said wings being capable of resilient lateral deflection relative to said longitudinal axis;
wherein said female clip member is connectable to a first component and said male clip member is insertable within a hole in a second component so as to connect the two components when said female clip member is connected to the first component, said male clip member is inserted in the hole such that said wings are fully inserted within the hole said male element is disposed within said slot and said engagement structure and said complementary engagement structure are engaged;
wherein said male element has a head at an end thereof, an indented waist inwardly from said head and a flute along a length thereof inwardly from said waist; and
wherein said slot has an inward projection for engaging said flute and limiting relative rotation between said female clip member and said male clip member.

19. The system according to claim 18, said slot having an inwardly extending tab for engaging said flute and limiting relative rotation between said female clip member and said male clip member; and said head defining a notch at the periphery thereof for passing said tab past said head.

20. A method of connecting and disconnecting components in automobiles by means of a multi-component connection system, said system comprising a female clip member including an opening having engagement structure disposed substantially along a boundary of said opening, and a male clip member including a male element insertable within said opening, said male element including complementary engagement structure for interconnecting said male clip member and said female clip member, said male clip member further including a fastener portion, said female clip member including bodies extending inwardly in said slot and said male clip member including structures for receiving said bodies, said method comprising the steps of:

affixing said female clip member to a first component;

inserting said male element into said opening of said female clip member so as to engage said engagement structure and said complementary engagement structure, thereby providing a releasable snap-fit connection between said female clip portion and said male clip portion; and inserting said male clip member within an opening in a second component such that fastener portion is inserted within the opening in the second component so as to connect the male clip member to the second component.

21. The method according to claim 20, further comprising the step of:

securing the first component between first and second flanges provided on said female clip member.

22. The method according to claim 21, further comprising the step of:

pulling the first component away from the second component to disconnect said female clip member from said male clip member.

* * * * *